United States Patent
Iwazaki et al.

(10) Patent No.: US 6,807,395 B2
(45) Date of Patent: Oct. 19, 2004

(54) COMPUTER ASSISTED LEARNING SYSTEM, STORAGE SERVER USED FOR COMPUTER ASSISTED LEARNING SYSTEM AND COMPUTER READABLE MEDIA RECORDING PROGRAM USED IN STORAGE SERVER

(75) Inventors: Ryuji Iwazaki, Shizuoka-ken (JP); Hiroshi Yamamoto, Saitama-ken (JP); Masanori Kawasumi, Saitama-ken (JP); Yuki Kamata, Tokyo (JP); Tatsuya Haraguchi, Kanagawa-ken (JP); Shuichi Tsujimoto, Kanagawa-ken (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 219 days.

(21) Appl. No.: 10/131,613

(22) Filed: Apr. 25, 2002

(65) Prior Publication Data

US 2002/0172925 A1 Nov. 21, 2002

(30) Foreign Application Priority Data

Apr. 26, 2001 (JP) .................................... P2001-130035

(51) Int. Cl.$^7$ ................................................ G09B 3/00
(52) U.S. Cl. ...................... 434/350; 434/118; 434/185; 434/323; 434/362; 702/19; 706/927
(58) Field of Search ............................... 434/118, 156, 434/157, 169, 185, 201, 307 R, 308, 322, 323, 350, 362, 365; 700/91; 702/19; 706/927; 709/203; 345/705, 733, 854

(56) References Cited

U.S. PATENT DOCUMENTS

| | | | |
|---|---|---|---|
| 5,725,384 A | * | 3/1998 | Ito et al. ..................... 434/350 |
| 5,727,950 A | * | 3/1998 | Cook et al. .................. 434/350 |
| 6,075,968 A | * | 6/2000 | Morris et al. ................ 434/350 |
| 6,091,930 A | * | 7/2000 | Mortimer et al. ............ 434/362 |
| 6,155,840 A | * | 12/2000 | Sallette ........................ 434/323 |
| 6,164,974 A | * | 12/2000 | Carlile et al. ................ 434/322 |
| 6,549,751 B1 | * | 4/2003 | Mandri ........................ 434/350 |
| 6,628,918 B2 | * | 9/2003 | Roschelle et al. ........... 434/350 |
| 6,654,695 B2 | * | 11/2003 | Shimura et al. .............. 702/19 |
| 2001/0023059 A1 | * | 9/2001 | Toki ............................ 434/157 |
| 2002/0160350 A1 | * | 10/2002 | Tanaka et al. ............... 434/350 |

FOREIGN PATENT DOCUMENTS

JP          9-258645          10/1997

* cited by examiner

Primary Examiner—Joe H. Cheng
(74) Attorney, Agent, or Firm—Foley & Lardner LLP

(57) ABSTRACT

A computer assisted learning system comprises a storage server to communicate with a contents server that controls voice data and text data of English conversation and a mobile phone through a network, and a terminal device to communicate with the storage server through a network. The storage server downloads voice data of English conversation in an information storage unit from the contents server according to a direction from the mobile phone, sends the downloaded voice data to a mobile phone, and when it is requested from the terminal device to obtain a text of an English conversation, downloads text data of an English conversation in the information storage unit and sends this downloaded text data to the terminal device. The terminal device makes the request to obtain a text of English conversation to the storage server and when the text data of English conversation is received from the storage server, prints and outputs this text data.

10 Claims, 9 Drawing Sheets

COMPUTER ASSISTED LEARNING
SYSTEM, STORAGE SERVER USED FOR
COMPUTER ASSISTED LEARNING SYSTEM
AND COMPUTER READABLE MEDIA
RECORDING PROGRAM USED IN
STORAGE SERVER

BACKGROUND OF THE INVENTION

1. Field of the Invention

This invention relates to a computer assisted learning system, a storage server that is used for this computer assisted learning system, and computer readable media recording a program that is used in this storage server.

2. Description of the Related Art

A computer assisted learning system between a host computer in an education center that is connected to the Internet and plural personal computers owned by users was disclosed in Japanese Patent Publication No. 9-258645, in which it was also disclosed that not only a personal computer but also a facsimile (FAX) are usable for exchanging questions and answers in this computer assisted learning system.

However, although personal computers and FAX are widely in use, the number of persons who owned these equipment is less and there is such a question that the number of persons who take the computer assisted course of learning of this system is restricted.

SUMMARY OF THE INVENTION

An object of this invention is to provide a computer assisted learning system that is capable of allowing more persons to take the computer assisted learning through a network.

Further, another object of this invention is to provide a storage server and a computer readable recording media that records a program used in this storage server for allowing many persons to take the computer assisted learning course easily through a network.

According to this invention, a computer assisted learning system is provided. This computer assisted learning system comprises: a contents server to control voice data and text data of conversation in specific language and a storage server to communicate with a portable terminal through a network; and a terminal device to communicate with the storage server through the network; wherein the storage server includes: an information storage unit to store information; voice data downloading means for downloading voice data of conversation in specific language in the information storage unit from the contents server according to a direction from the portable terminal; voice data sending means for reading the downloaded voice data from the information storage unit and sending to the portable terminal; text data downloading means for downloading a text data of conversation in specific language from the contents server in the information storage unit when it is requested by the terminal device to obtain a specific language conversation text; text data sending means for reading the downloaded text data from the information storage unit and sending to the terminal device; wherein the terminal device includes: requesting means for making the request to obtain a text of conversation in specific language to the storage server; and printing and outputting means for printing and outputting text data when text data of conversation in specific language is received from the storage server.

Further, according to this invention, a storage server is provided for communicating with a contents server that controls voice data and text data of specific language conversation, a portable terminal and a terminal device through a network. This storage server comprises: an information storage unit to store information; voice data downloading means for downloading the voice data of conversation in specific language in the information storage unit from the contents server according to a direction from the portable terminal; voice data sending means for reading the downloaded voice data from the information storage unit and sending to the portable terminal; text data downloading means for downloading the text data of conversation in specific language in the information storage unit from the contents server when it is requested by the terminal device to obtain the text of conversation in specific language; and text data sending means for reading the downloaded text data from the information storage unit and sending to the terminal device.

Further, according to this invention, a storage media storing a program that is readable by a computer which is used as a contents server for communicating with a contents server that controls voice data and text data of specific language conversation, a portable terminal and a terminal device through a network is provided. This program comprises the steps of: storing information in an information storage unit; downloading voice data of conversation in specific language from the contents server in the information storage unit according to a direction from the portable terminal; reading the downloaded voice data from the information storage unit and sending the voice data to the portable terminal; downloading text data of conversation in specific language in the information storage unit from the contents server when it is requested by the terminal device to obtain a text of conversation in specific language; and reading the downloaded text data from the information storage unit and sending to the terminal device.

DETAILED DESCRIPTION OF THE EMBODIMENTS

Figure 1:
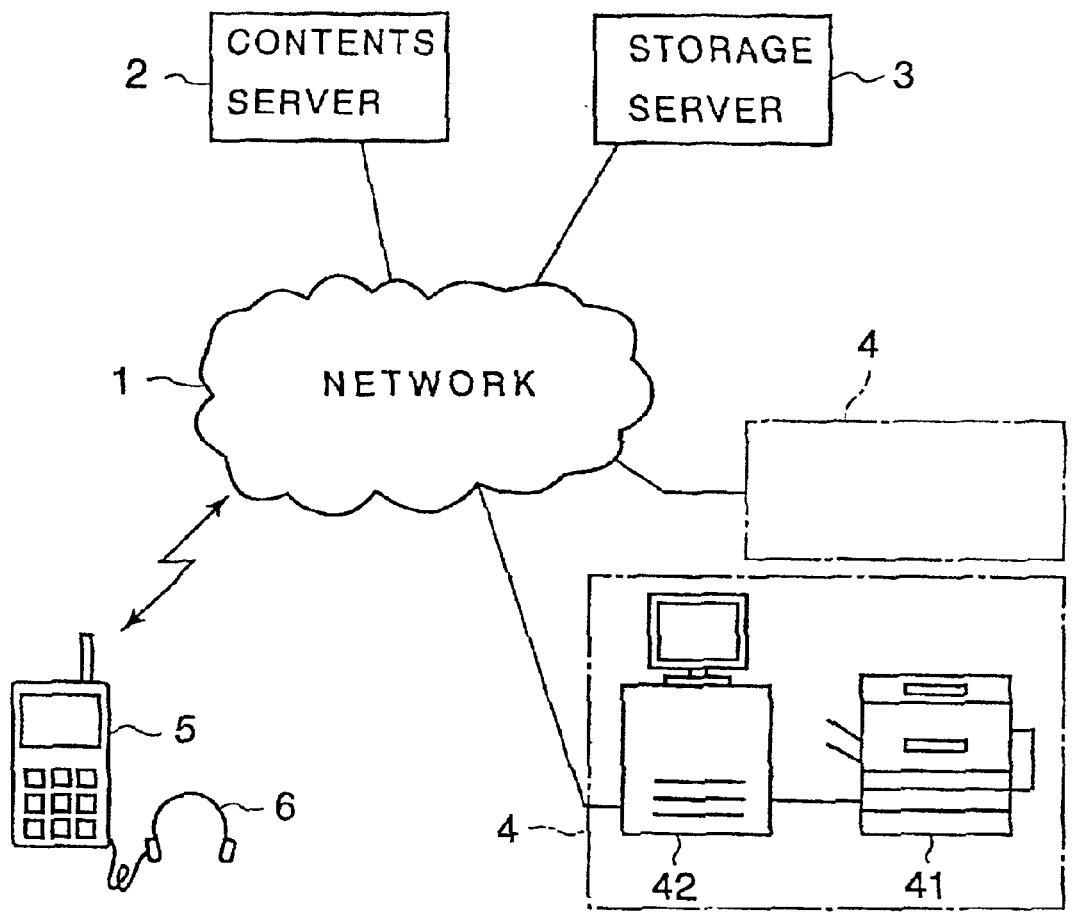
FIG. 1 is a block diagram showing the structure of the entire system showing a first embodiment of this invention.
Figure 2:
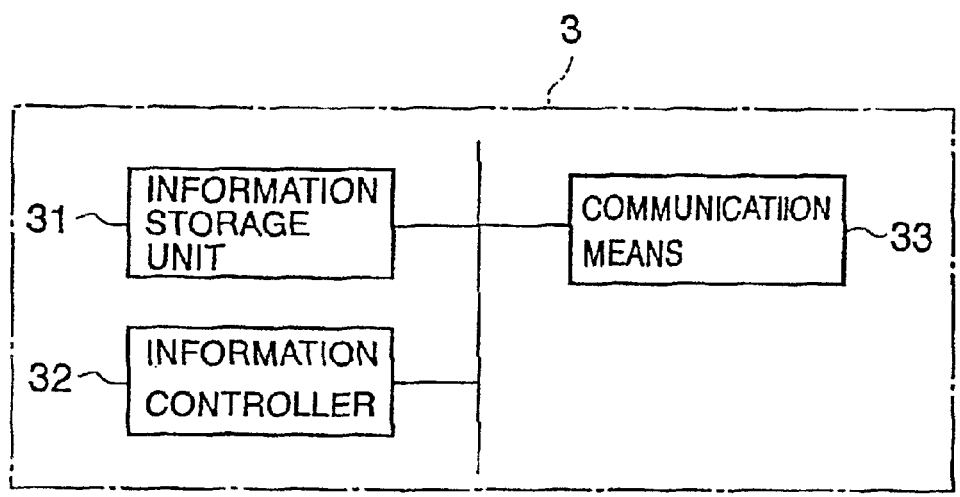
FIG. 2 is a block diagram showing the structure of a storage server in the system shown in FIG. 1.

Preferred embodiments of this invention will be described below referring to the drawings.

(First Embodiment)

In this embodiment, this invention applied to a computer assisted learning of English conversation will be described.

FIG. 1 is a block diagram showing the entire structure of the system. A contents server 2 and a storage server 3 that control voice data and text data of English conversation that is a specific language conversation are connected to a network 1 that is the Internet. Plural-terminal devices 4 are connected to the network 1. Each terminal device 4 is installed in, for example, a convenience store, etc. The contents server 2 stores a pair of voice data and text data of various levels of English conversation courses and contents are updated for every specific period, for example, daily.

The storage server 3 is capable of communicating with a mobile phone 5 that is a portable terminal through the network 1. The mobile phone 5 has an electronic mail exchanging function and a stick-shaped IC memory can be inserted and furthermore, a head phone 6 can be connected thereto and it is possible to download voice and music data in an IC memory and listen to it using a headphone 6.

Figure 4:
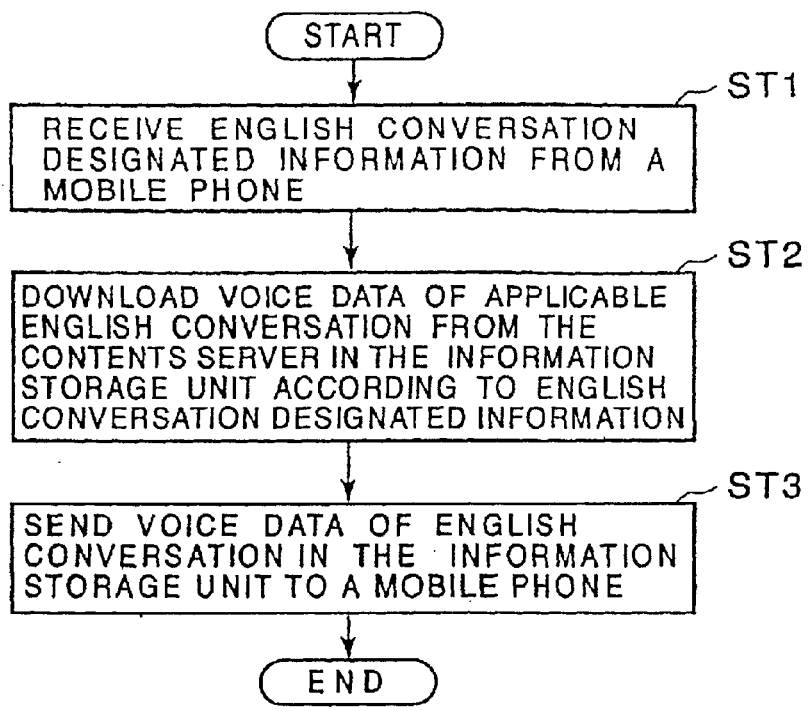
FIG. 4 is a flowchart showing the voice data obtaining process of the storage server in the system shown in FIG. 1.

The storage server 3 has a hard disc drive, etc. and is composed of an information storage unit 31 that is an information storage means for storing voice data and text data sent from the contents server 2, a CPU, a. ROM and a RAM, and is equipped with an information controller 32 for controlling information stored in the information storage unit 31 and a password of a text data, and a communication means 33 for communicating with the contents server 2 and the mobile phone 5 through the network 1 and for taking text data out of the information storage unit 31 and sending to the terminal device 4 through the network 1 when it is requested by the terminal device 4 to obtain a text as shown in FIG. 4.

Figure 3:
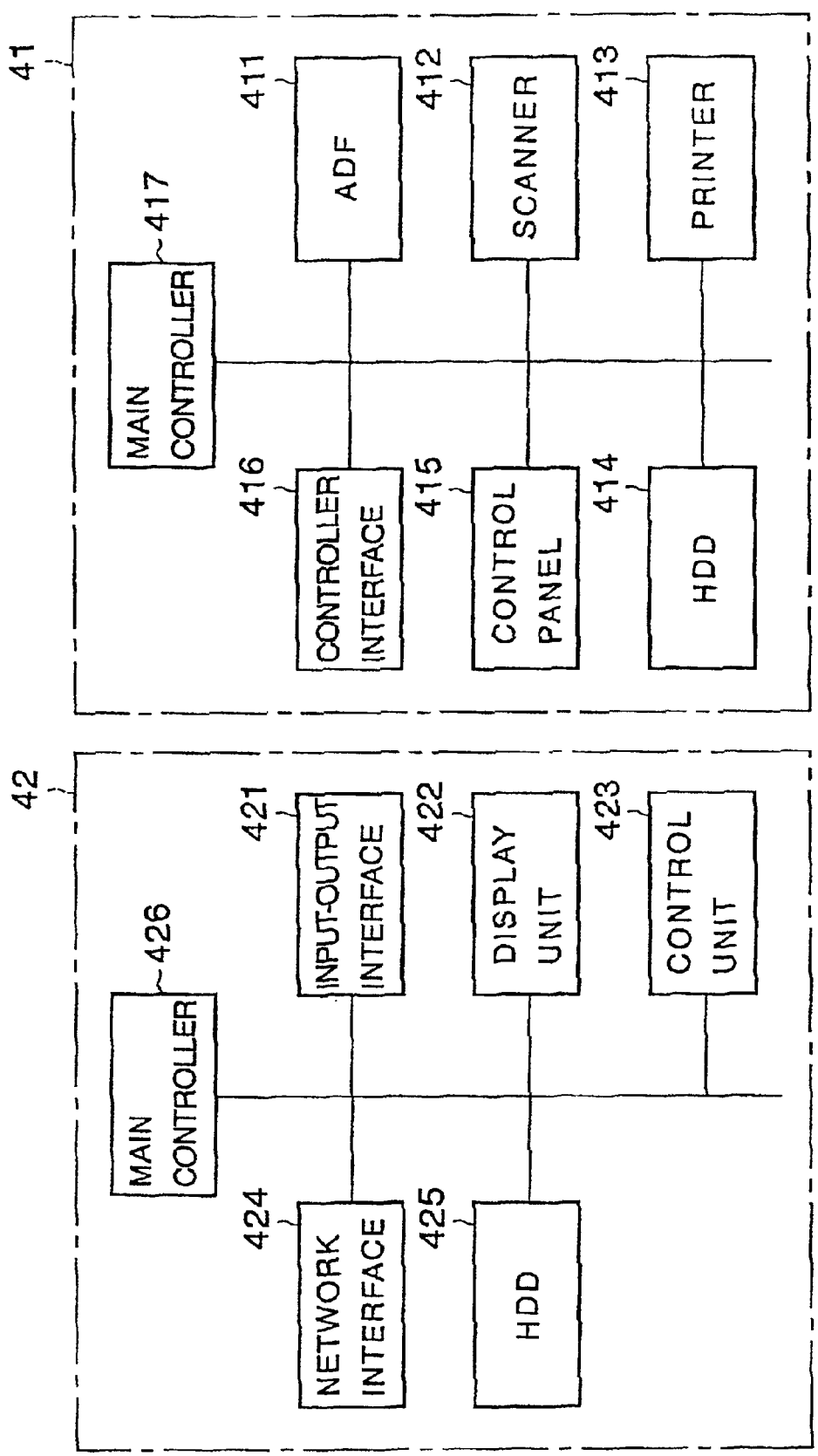
FIG. 3 is a block diagram showing the structure of a terminal device in the system shown in FIG. 1.

The terminal device 4 is composed of an input-output unit 41 comprising a digital composite unit, etc., and a controller 42 that controls the input-output unit 41 as shown in FIG. 3. The input-output unit 41 is composed of an automatic document feeder (ADF) 411, a scanner 412 for reading documents, a printer 413 that is a printing/outputting means, a hard disc drive (HDD) 414, a control panel 415, a controller interface 416 connected to a controller 42, a CPU, a ROM and a RAM, and is provided with a main controller 417 that controls these component elements.

The controller 42 is composed of an input-output interface 421 connected to the input-output unit 41, a display unit 422 comprising a liquid crystal display, etc., a control unit 423, a network interface 424 connected to the network 1, a hard disc drive (HDD) 425, a CPU and a ROM and is provided with a main controller 426 that controls these component units. The control unit 423 is provided with keys for making a request to obtain a text to the storage server 3. The controller 42 makes a request to obtain a text to the storage server 3 by operating these keys (a requesting means). Further, the terminal device 4 has own peculiar address information and sends this address information when sending a request to obtain a text to the storage server 3.

In this computer assisted learning system, a user who wants to take an English conversation course accesses to the storage server 3 by using the mail function of the mobile phone 5 and designates a desired course of English conversation. The information on the designated English conversation course is sent to the storage server 3 from the mobile phone 5.

When the designated information on desired English conversation course is received through the mobile phone 5, the storage server 3 executes the process according to the flowchart shown in FIG. 4.

That is, in Step ST 1, a designated information on a desired English conversation is received through the mobile phone 5 and in Step ST 2, voice data of applicable English conversation is downloaded in the information storage unit 31 from the contents server 2 by the voice data downloading means according to the received designated information on English conversation. Then, in Step ST 3, the voice data downloaded in the information storage unit 31 is read and sent to the mobile phone 5 by a voice data sending means.

The voice data received by the mobile phone 5 is taken in an IC memory. Hereafter, the English conversation can be heard through the mobile phone 5 using the headphone 6. When a user who is listening to the English conversation using the mobile phone 5 desires to obtain a text of this English conversation, that user sends a designating information to obtain an English conversation text to the storage server 3 using the mail function.

Figure 5:
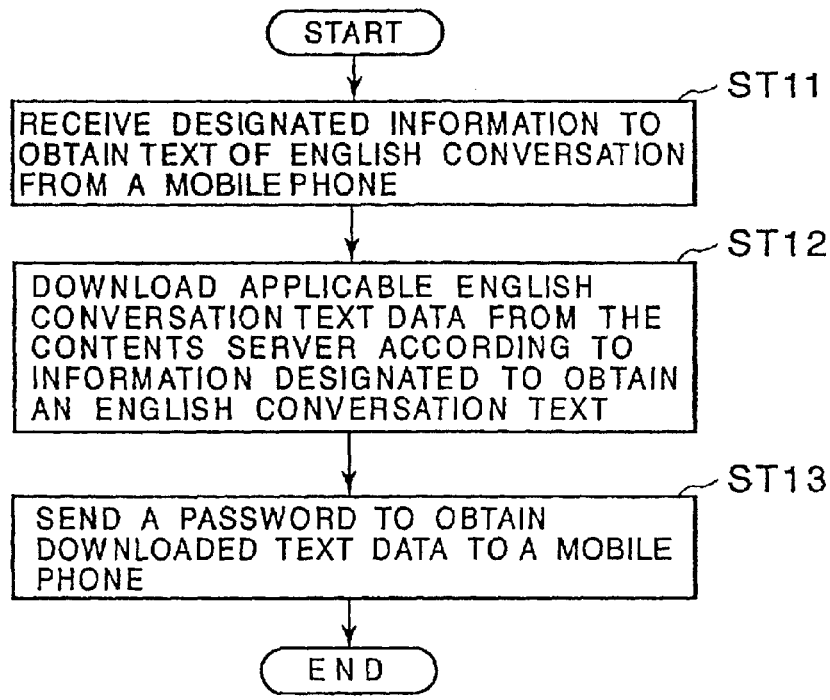
FIG. 5 is a flowchart showing the text data obtaining process of the storage server in the system shown in FIG. 1.

When the designating information to obtain an English conversation text is received through the mobile phone 5, the storage server 3 executes the process according to the flowchart shown in FIG. 5. That is, when a designated information to obtain an English conversation text is received from the mobile phone 5 in Step ST 11, the text data of an applicable English conversation is downloaded in the information storage unit 31 from the contents server 2 by the text data downloading means based on the designated information for obtaining an English conversation text. That is, a text data corresponding to the downloaded information as a voice data is downloaded in the information storage unit 31. In Step ST 13, a password required for obtaining this downloaded English conversation text data is sent to the mobile phone 5. Further, an ID code is usable for a password.

Figure 6:
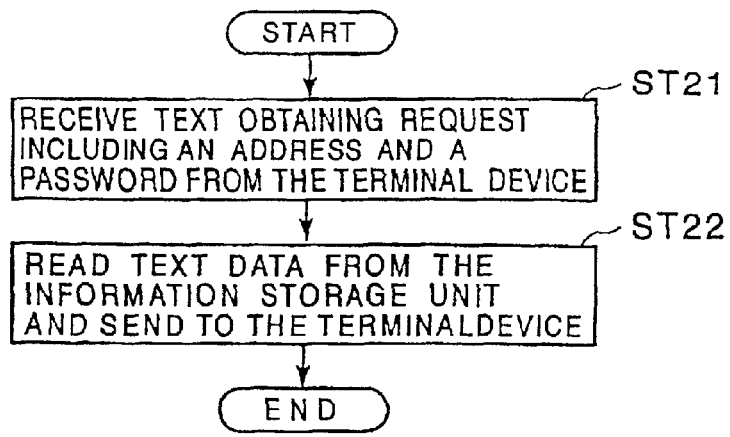
FIG. 6 is a flowchart showing the text data sending process of the storage server in the system shown in FIG. 1.

Further, when a request for obtaining a text is received from the terminal device 4, the storage server 3 executes the process according to the flowchart shown in FIG. 6. That is, when a text obtaining request including an address and a password is received from the terminal device 4 in Step 21, the text data is read out from the information storage unit 31 and sent to the terminal device 4 by the text data sending means in Step ST 22.

Figure 7:
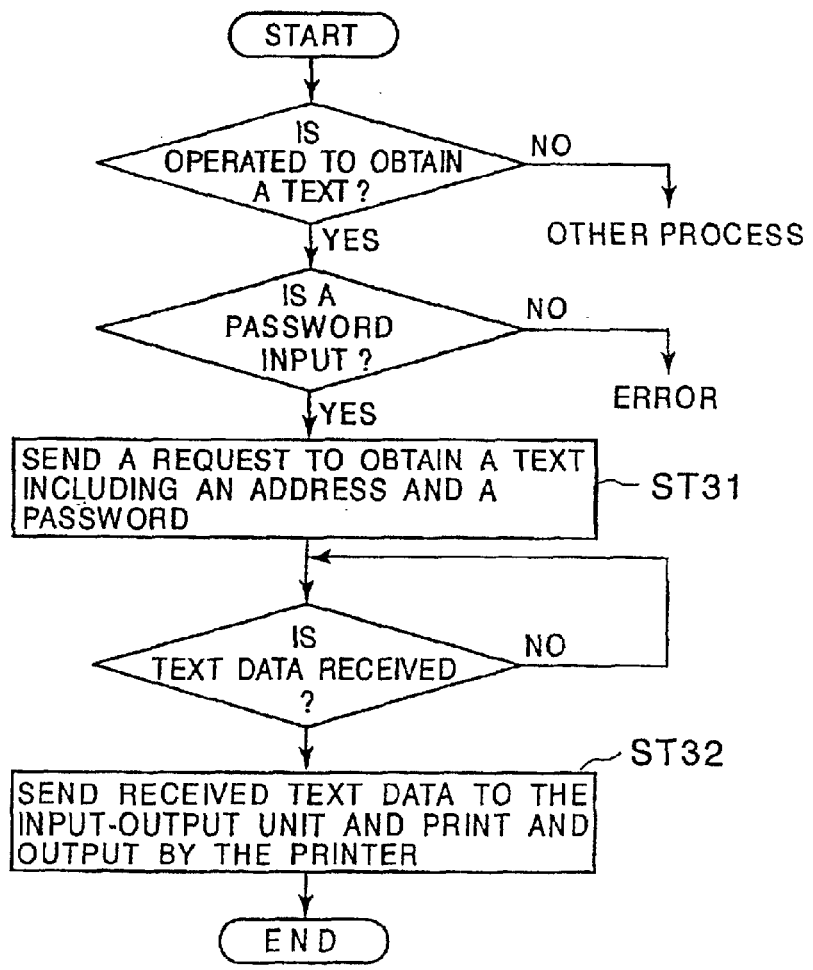
FIG. 7 is a flowchart showing the text data obtaining process of the terminal device in the system shown in FIG. 1.

When a password is received from the storage server 3 by a mobile phone 5, after checking its contents, a user goes to a near convenience store and operates the terminal device 4 installed therein. At this time, the terminal device 4 executes the process according to the flowchart shown in FIG. 7.

That is, when an operation is made to obtain a text in the control unit 423, whether a password was input is checked and when a password was input, a request for obtaining a text including an address and a password of the terminal device 4 is sent to the storage server 3 in Step ST 31. Further, if a password was not input, the operation becomes erroneous and need to be done again.

When the receipt of text data from the storage server 3 was waiting and received from the terminal device 4 under this state, the received text data is sent to the input-output unit 41 and printed on paper by the printer 413 and output in Step ST 32.

In the structure described above, when a user accesses to the storage server 3 and sends designated information of English conversation desired to hear using the mail function of the mobile phone 5, the voice data of applicable English conversation is downloaded in the information storage unit 31 from the contents server 2 in the storage server 3. Then, this voice data is sent to the mobile phone 5. Thus, it becomes possible to heat the English conversation in the mobile phone 5 using the headphone 6.

When a user who is hearing the English conversation desired to obtain a text too, the user sends a request to obtain an English conversation text to the storage server 3 using the mail function of the mobile phone 5. In the storage server 3, the text data of an applicable English conversation is downloaded in the information storage unit 31 from the contents server 2 and a password is sent to the mobile phone 5.

A user who received the password goes to a near convenience store and inputs the password by operating the control unit 423 of the terminal device 4 and sends a request to obtain a text. Thus, a request for obtaining a text including an address for notifying a place of the terminal device 4 and a password for identifying a user and a text is sent to the storage server 3 through the terminal device 4.

When the password is checked in the storage server 3, the text data is read from the information storage unit 31 and sent to an applicable terminal device. The terminal device 4 prints the received text data on paper by the printer 413 and output. Thus, a user is able to obtain a text of the English conversation heard.

Thus, any user who has a mobile phone 5 having a mail function and is connectable with the headphone 6 is able to easily hear an English conversation. Furthermore, when it is desired to have a text, a text is easily obtained using the terminal device 4 that is installed in a near convenience store. The rate of diffusion of the mobile phone 5 is far higher than that of personal computers and a text can be easily obtained as desired and it becomes therefore possible for more persons to take the computer assistance learning course.

Further, although text data are output after downloading voice data in this embodiment, voice data may be downloaded after printing and outputting text data. Further, as the text data output is restricted for one time only, the number of sheets to be printed is a few sheets and therefore, it is also possible to take this English conversation course during the commuting time.

Further, this embodiment is described for the invention applied to the computer assisted learning of an English conversation course but is not necessarily limited to the English conversation course only but can be applied to other specific language conversation courses.

(Second Embodiment)

This embodiment is described for the invention applied to the computer assisting learning of answer submission course.

Figure 8:
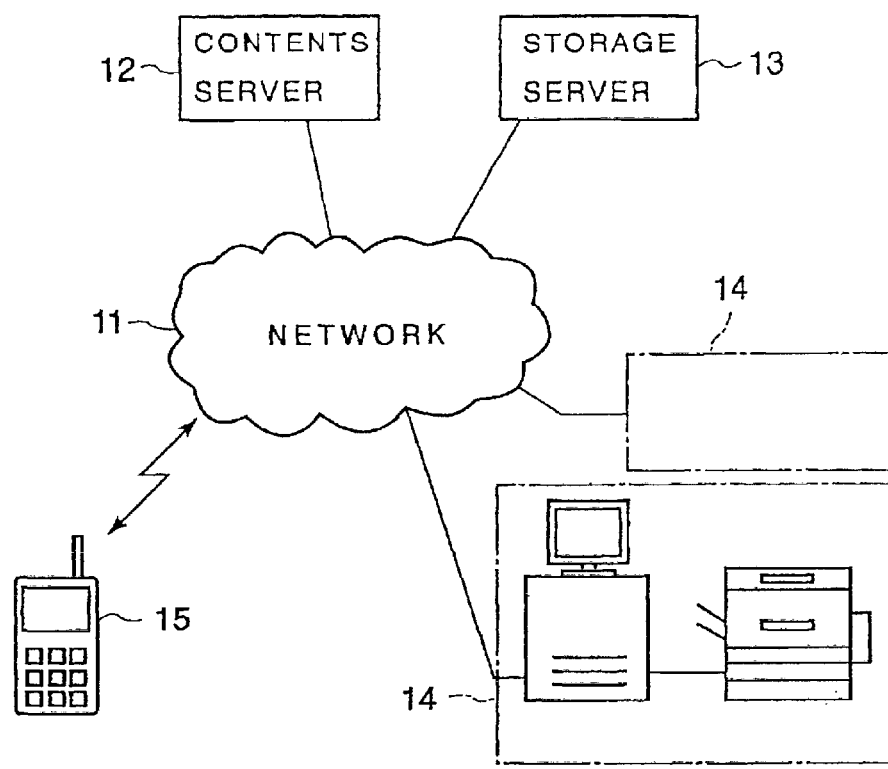
FIG. 8 is a block diagram showing the structure of the entire system in a second embodiment of this invention.

FIG. 8 is a block diagram showing the structure of the entire system. A contents server 12 and a storage server 13 for controlling the courses are connected to a network 11 such as the Internet. Further, plural terminal devices 14 are connected to the network 11. A terminal device 14 is installed in a convenience store. A storage server 13 and the terminal device 14 are in the same construction as those of the storage server 3 and the terminal device 4 in the first embodiment described above.

The contents server 12 stores a pair of questions and answers of various kinds of learning courses. The storage server 13 is capable of communicating with a mobile phone 15 that is a portable terminal through the network 11. The mobile phone 15 has an electronic mail exchanging function.

In this computer assisted learning system, when a user who desires to take a course of learning accesses to the storage server 13 using the mail function of the mobile phone 15 and designates questions of a desired course, information specifying the designated course is sent to the storage server 13 through the mobile phone 15.

Figure 9:
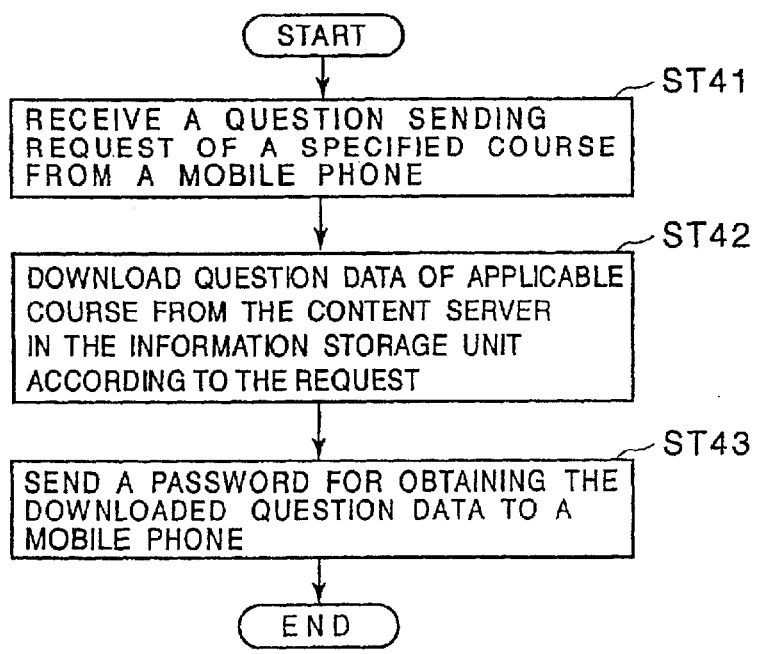
FIG. 9 is a flowchart showing the question data obtaining process of the storage server in the system shown in FIG. 8.

When a sending request for questions of the course specified from the mobile phone 15 is received, the storage server 13 executes the process according to the flowchart shown in FIG. 9.

That is, in Step ST 41, a request for sending the questions of specific course is received from the mobile phone 15 and in Step ST 42, question data of the applicable course is downloaded in the information storage unit 31 from the contents server 12 by a question storage means according to the received course question sending request. Then, in Step ST 43, a password to obtain the downloaded question data is sent to the mobile phone 15 that made the request.

Figure 10:
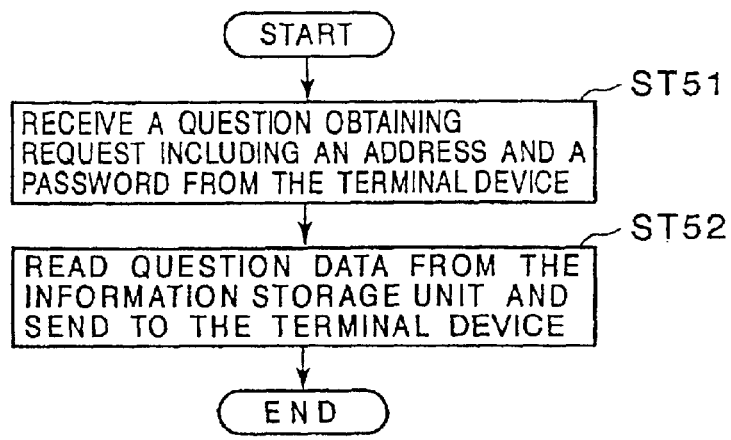
FIG. 10 is a flowchart showing the question data obtaining process of the storage server in the system shown in FIG. 8.

Further, when requested by the terminal device 14 to obtain questions, the storage server 13 processes the request according to the flowchart shown in FIG. 10. That is, when a question obtaining request including an address and a password is received from the terminal device 14 in Step ST 51, the storage server 13 reads the question data out of the information storage unit 31 and sends to the terminal device 14 by a question sending means in Step ST 52.

Figure 11:
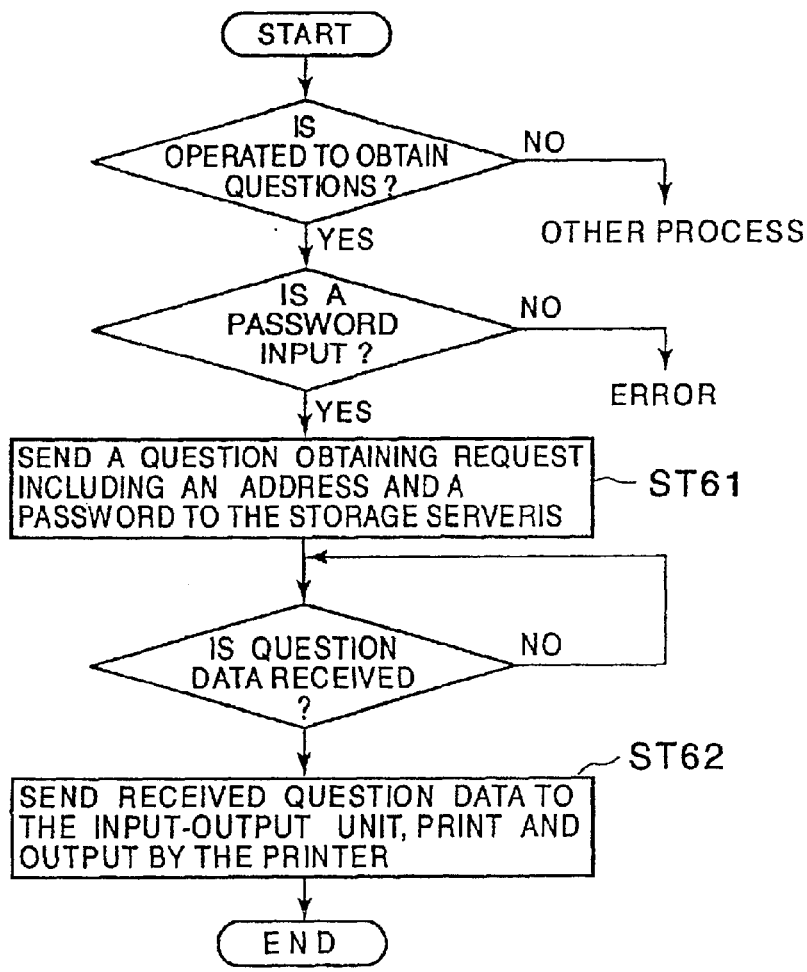
FIG. 11 is a flowchart showing the question data obtaining process of the terminal device in the system shown in FIG. 8.

When receiving a password from the storage server 13 by the mobile phone 15, after confirming its contents, a user goes to a near convenience store and operates the terminal device 14 installed therein. At this time, the terminal device 14 executes the process according to the flowchart shown in FIG. 11.

That is, when the control unit 423 is operated to obtain questions, it is checked whether a password was input. When a password was input, a request for obtaining questions including an address of the terminal device 14 and a password is sent to the storage server 13 by the question requesting means in Step ST 61. Further, if a password was not input, an error will result and the rework is required.

Under this state, the receipt of question data from the storage server 13 is waiting and when the question data is received, the received question data is sent to an input-output unit 41 and printed on paper and output by the printer 413.

When receiving the question sheets, a user brings them back to an own home and solves the questions. Then, when the question sheet is made as an answer sheet, a user goes to a convenience store in which the terminal device 14 is installed. The convenience store at this time is not necessarily the same convenience store wherein the question sheet was output.

Then, a user operates the terminal device 14. That is, setting an answer sheet in the scanner 412, inputting a password, a user sends the answer sheet. Further, a bar code identifying the course is printed on the question sheet sent from the storage server 13. When this question sheet is used as an answer sheet, a bar code is printed thereon as a matter of course. In addition, a password is the same as the password when the questions were requested.

Figure 12:
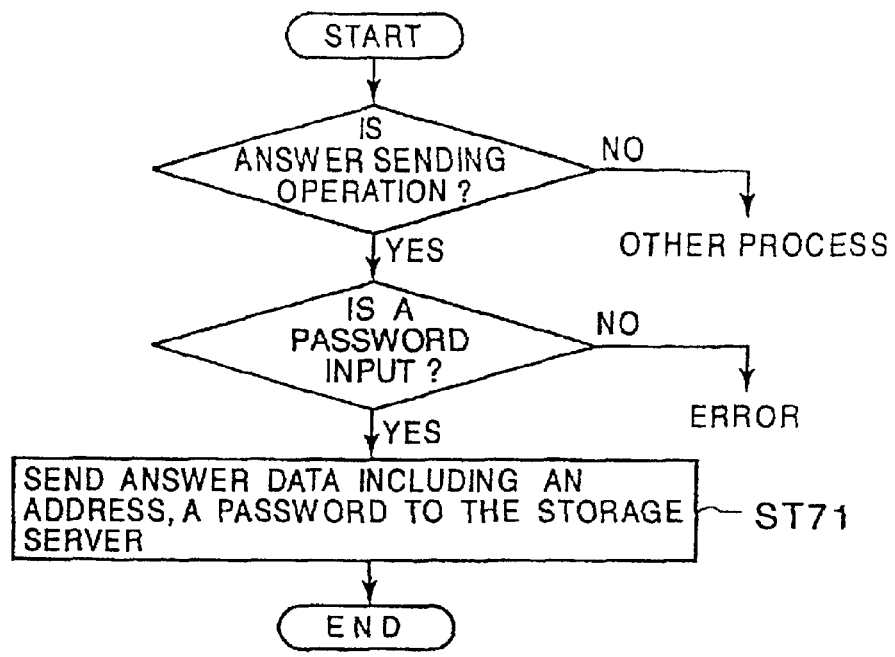
FIG. 12 is a flowchart of the answer data sending process of the terminal device in the system shown in FIG. 8.

That is, when the answer was sent by the control unit 423, whether a password was input is checked and if a password was input, an answer data including an address of the terminal device 14 and a password are sent to the storage server 13 in Step ST 71 as shown in FIG. 12. The answer data at this time are an image read by the scanner 412 from an answer sheet and digitized by converting into character codes by an answer preparing means. Further, if a password was not input, an error will result and the rework is required.

Figure 13:
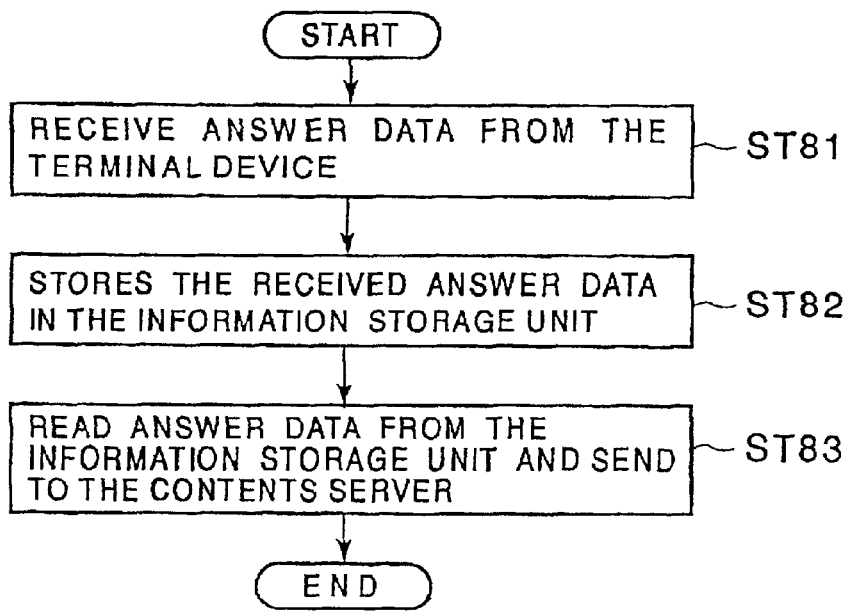
FIG. 13 is a flowchart showing the answer data obtaining and sending process of the storage server in the system shown in FIG. 8.
Figure 14:
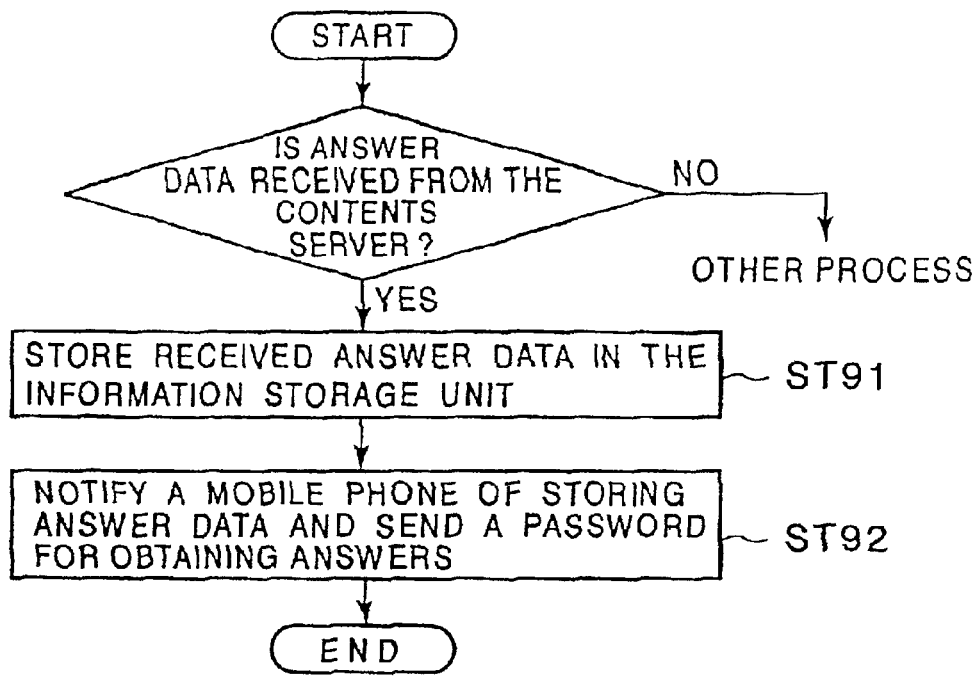
FIG. 14 is a flowchart showing the answer data obtaining process of the storage server in the system shown in FIG. 8.

When an answer data is received from the terminal device 14, the storage server 13 processes the answer data according to the flowchart shown in FIG. 13. That is, when an answer data is received in Step ST 81, the received answer data is stored in the information storage unit 31 in Step ST 82. Then, the answer data is read from the information storage unit 31 and is sent to the contents server 12 by an answer sending means in Step ST 83.

When receiving the answer data, the contents server 12 prepares answers to questions that are the base for these answers and sends to the storage server 13 as the answer data.

After sending the answer data to the contents server 12, the storage server 13 waits to receive answer data from the contents server 12. That is, the storage server 13 waits the receipt of answer data from the contents server 12 and when the answer data is received, stores the received answer data in the information storage unit 31 in Step ST 91 and notifies an applicable mobile phone 15 of the storage of the answer data by a notification means and sends a password that is required for obtaining the answers to the mobile phone 15 in Step ST 92.

Figure 15:
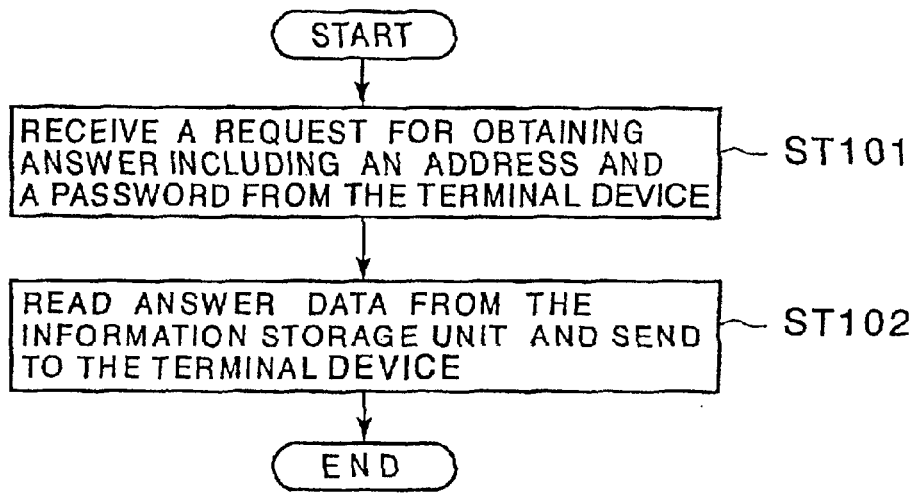
FIG. 15 is a flowchart showing the answer data sending process of the storage server in the system shown in FIG. 8.

Further, when a request for obtaining answers is received from the terminal device 14, the storage server 13 executes the process according to the flowchart shown in FIG. 15. That is, when a request for obtaining answers including an address and a password is received from the terminal device 14 in Step ST 101, the storage server 13 reads the answer data out of the information storage unit 31 and sends to the terminal device 14 by the answer sending means in Step ST 102.

Figure 16:
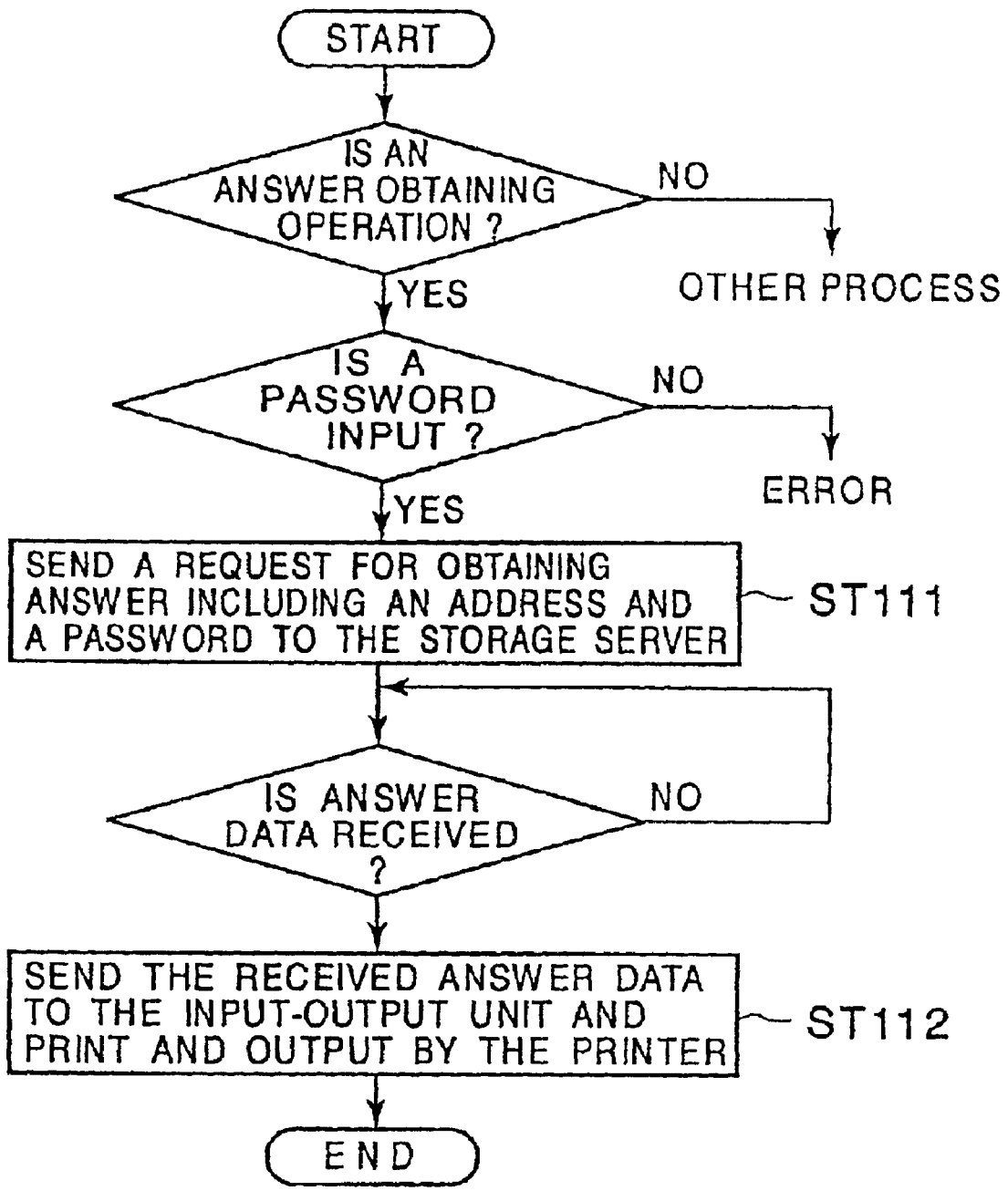
FIG. 16 is a flowchart showing the answer data obtaining process of the terminal device in the system shown in FIG. 8.

When a password is received from the storage server 13 through the mobile phone 5, after checking its contents, a user goes to any convenience store and operates a terminal device 14 that is installed therein. At this time, the terminal device 14 executes the process according to the flowchart shown in FIG. 16.

That is, when the operation is made to obtain the answer by the control unit 423, whether a password was input is checked. If a password was input, an answer obtaining request including an address of the terminal device 14 and a password is sent to the storage server 13 in Step ST 111. If a password was not input, an error will result and the rework is required.

Under this state, the receipt of answer data from the storage server 13 is waited and when the answer data is received, the received data is sent to the input-output unit 41 wherein the data is printed on paper and output by the printer 413. At this time, the answer data may be answer data only or answer data added with comments of correct or not.

In such the structure as described above, when a user accesses to the storage server 13 using the mail function of the mobile phone 15 and sends a request for sending questions of a course desired to take, the storage server 13 downloads question data of an applicable course of lesson in the information storage unit 31 from the contents server 12 and sends a password to the mobile phone 15.

A user who received the password goes to any convenience store, operates the control unit 423 of the terminal device 14, inputs the password and sends a question obtaining request. Thus, a question obtaining request including an address showing a place of the terminal device 14 and a password for identifying a user and a text is sent to the storage server from the terminal device 14.

When checking the password, the storage server 13 reads question data from the information storage unit 31 and sends to an applicable terminal device 14. The terminal device 14 prints the received question data on paper by the printer 413 and outputs. Thus, a user is able to obtain the question sheets of the desired course of lesson.

When preparing an answer sheet by entering answers into the question sheet, a user goes to the terminal device 14 and sends the answer sheet to the storage server 13 as the read answer data using the scanner 12 of the terminal device 14. The storage server 13 sends the received answer data to the contents server 12. The contents server 12 prepares answers to the received answer sheet and sends the answer data to the storage server 13.

When receiving the answer data, the storage server 13 stores the data in the information storage unit 31 and informs an applicable mobile phone 15 that the answer data is stored, and sends a password.

The user goes to the terminal device 14, inputs the password by operating the control unit 423 of the terminal device 14 and sends a request for obtaining answer. Thus, a request for obtaining answer containing an address showing a place of the terminal device 14 and the password identifying a user and a text is send to the storage server 13 through the terminal device 14.

When checking the password, the storage server 13 reads out the answer data from the information storage unit 31 and sends the data to an applicable terminal device 14. The terminal device 14 prints the received question data on paper by the printer 413 and outputs. Thus, the user is able to obtain answers to questions of a desired course of lesson.

As described above, any user who has a mobile phone equipped with a mail function is able to learn questions of a desired course of lesson simply. It is also possible to obtain questions and answers and send prepared answers easily using a terminal device 14 that is installed in a near convenience store. Furthermore, the rate of diffusion of mobile phones is far higher than that of personal computers. Therefore, it becomes possible to encourage more persons to take the computer assisted learning course easily.

As described above, according to this invention, it is possible to provide the Computer Assisted Learning System that is capable of encouraging many persons to take the computer assisted learning easily through a network.

Further, according to this invention, it is also possible to provide a storage server for enabling many persons to take the computer assisted learning course easily through a network and a media recording a program that is used by the storage server.

What is claimed is:

1. A computer assisted learning system comprising:
   a contents server configured to control voice data and text data of conversation in a specific language and a storage server to communicate with a mobile phone through a network; and
   a terminal device installed in a store and configured to communicate with the storage server through the network;
   wherein the storage server includes:
   an information storage unit configured to store information;

voice data downloading means for downloading voice data of conversation in a specific language in the information storage unit from the contents server according to a direction from the mobile phone;

voice data sending means for reading the downloaded voice data from the information storage unit and sending to the mobile phone;

text data downloading means for downloading text data of conversation in the specific language, which corresponds to the voice data sent by the voice data sending means, from the contents server in the information storage unit when it is requested by the terminal device to obtain a specific language conversation text;

text data sending means for reading the downloaded text data from the information storage unit and sending to the terminal device;

wherein the terminal device includes:

requesting means for making the request to obtain a text of conversation in the specific language to the storage server; and printing and outputting means for printing and outputting text data when text data of conversation in the specific language is received from the storage server.

2. A storage server configured to communicate with a contents server for controlling voice and text data of conversation in a specific language, a mobile phone, and a terminal device installed in a store through a network in a computer assisted learning system, the storage server comprising:

an information storage unit configured to store information;

voice data downloading means for downloading the voice data of conversation in the specific language in the information storage unit from the contents server according to a direction from the mobile phone;

voice data sending means for reading the downloaded voice data from the information storage unit and sending to the mobile phone;

text data downloading means for downloading the text data of conversation in the specific language in the information storage unit, the text data corresponding to the voice data sent by the voice data sending means, from the contents server when it is requested by the terminal device to obtain the text of conversation in the specific language; and text data sending means for reading the downloaded text data from the information storage unit and sending to the terminal device.

3. A storage media storing a program that is readable by a computer used as a storage server configured to communicate with a contents server configured to control voice and text data of conversation in a specific language, a mobile phone, and a terminal device installed in a store through a network; the program when executed by the computer performing steps comprising:

storing information in an information storage unit in the storage server;

downloading voice data of conversation in the specific language from the contents server in the information storage unit according to a direction from the mobile phone;

reading the downloaded voice data from the information storage unit and sending the voice data to the mobile phone;

downloading text data of conversation in the specific language in the information storage unit from the contents server when it is requested by the terminal device to obtain a text of conversation in the specific language; and reading the downloaded text data from the information storage unit and sending to the terminal device.

4. A computer assisted learning system comprising:

a storage server configured to communicate with a contents server to control courses of lessons and a mobile phone through a network; and a terminal device installed in a store and configured to communicate with the storage server through the network;

wherein the storage server includes:

an information storage unit configured to store information;

question storing means for receiving question data of the course of lessons from the contents server according to a direction from the mobile phone and storing the received question data in the information storage unit;

question sending means for reading question data of the course of lessons from the information storage unit and sending the question data to the mobile phone when it is requested by the terminal device to obtain questions of a course of lessons;

answer sending means for sending answer data to the contents server when the answer data to questions is received from the terminal device;

notifying means for storing answer data to questions from the contents server in the information storage unit and notifying the mobile phone; and answer sending means for reading the answer data stored in the information storage unit and sending the answer data to the terminal device when it is requested by the terminal device to obtain an answer;

wherein the terminal device includes:

question requesting means for making the request to obtain questions of courses of lessons to the storage server;

a scanner;

answer preparing means for reading answers and preparing answer data by the scanner;

answer requesting means for making the request to obtain answers jointly with the prepared answer data to the storage server; and printing means for printing the questions when receiving the question data of the course of lessons from the question sending means and printing the answers when receiving the answer data of the course of lessons from the answer sending means.

5. A storage server configured to communicate with a contents server that controls courses of lessons, a mobile phone, and a terminal device installed in a store through a network in a computer assisted learning system, the storage server comprising:

an information storage unit configured to store information;

question storing means for receiving question data of a course of lessons from the contents servers according to a direction from the mobile phone and storing the received question data in the information storage unit;

question sending means for reading question data of the course of lessons from the information storage unit when it is requested from the terminal device to obtain questions of the course of lessons and sending the question data to the mobile phone;

answer sending means for sending answer data to the contents server when receiving the answer data to questions from the terminal device;

notifying means for storing answer data to questions in the information storage unit when receiving from the contents server and notifying the mobile phone of the receiving and storing of answer data; and answer sending means for reading the answer data stored in the information storage unit and sending the answer data to the terminal device when it is requested by the terminal device to obtain the answers.

6. A storage media storing a program that is readable by a computer used as a storage server configured to communicate with a contents server to control courses of lessons, a mobile phone, and a terminal device installed in a store through a network; the program when executed by the computer performing steps comprising:

storing information in an information storage unit in the storage server;

receiving question data of a course of lessons from the contents server according to a direction from the mobile phone and storing the received question data in the information storage unit;

reading question data of the course of lessons from the information storage unit and sending the question data to the mobile phone when it is requested by the terminal device to obtain questions of the course of lessons;

sending answer data to the contents server when receiving the answer data to questions from the terminal device;

receiving answer data to questions from the contents server, storing the answer data in the information storage unit and notifying the mobile phone of the receipt; and reading the answer data stored in the information storage unit and sending the answer data to the terminal device when it is requested from the terminal device to obtain the answers.

7. A computer assisted learning system comprising:

a storage server configured to communicate with a contents server that controls courses of lessons, and a mobile phone through a network; and a terminal device installed in a store and configured to communicate with the storage server through the network;

wherein the storage server includes:

an information storage unit configured to store information;

question storing means for receiving question data of a course of lessons from the contents server according to a direction from the mobile phone and storing the received question data in the information storage unit; and question sending means for reading question data of a course of lessons from the information storage unit when it is requested by the terminal device to obtain questions of a course of lessons and sending the question data to the mobile phone;

wherein the terminal device includes:

question request means for making the request to obtain questions of a course of lessons to the storage server; and printing means for printing the questions when receiving the data of the course of lessons from the storage server.

8. A storage server configured to communicate with a contents server that controls courses of lessons, a mobile phone, and a terminal device installed in a store through a network in a computer assisted learning system, the storage server comprising:

an information storage unit configured to store information;

question storing means for receiving question data of a course of lessons from the contents server according to a direction from the mobile phone and storing the received question data in the information storage unit; and question sending means for reading question data of a course of lessons from the information storage unit when it is requested from the terminal device to obtain questions of course lessons and sending the question data to the mobile phone.

9. A storage media storing a program that is readable by a computer used as a storage server configured to communicate with a contents server to control courses of lessons, a mobile phone, and a terminal device installed in a store through a network, the program when executed by the computer performing steps comprising:

storing information in an information storage unit in the storage server;

receiving question data of a course of lessons from the contents server according to a direction from the mobile phone and storing the question data in the information storage unit; and reading question data of a course of lessons from the information storage unit and sending the question data to the mobile phone when it is requested by the terminal device to obtain questions of a course of lessons.

10. A server for use in a network that includes a mobile phone, a terminal device, and another server, the server comprising:

a communication unit that receives a request from the mobile phone for voice data, and is configured for receiving the voice data in a specific language from the another server;

an information storage medium that is configured to store the received voice data; and an information controller that controls contents of the information storage medium;

wherein the communication unit is further configured to receive a request from the terminal device for text data that corresponds to the voice data, and is configured to receive the text data from the another server, and wherein the communication is further configured to send the requested text data to the terminal device.

* * * * *